Sept. 25, 1973   R. E. SMITH   3,761,345
NONWOVEN STRUCTURE FOR REINFORCING RESINOUS MATERIAL
Original Filed April 3, 1969   5 Sheets-Sheet 1
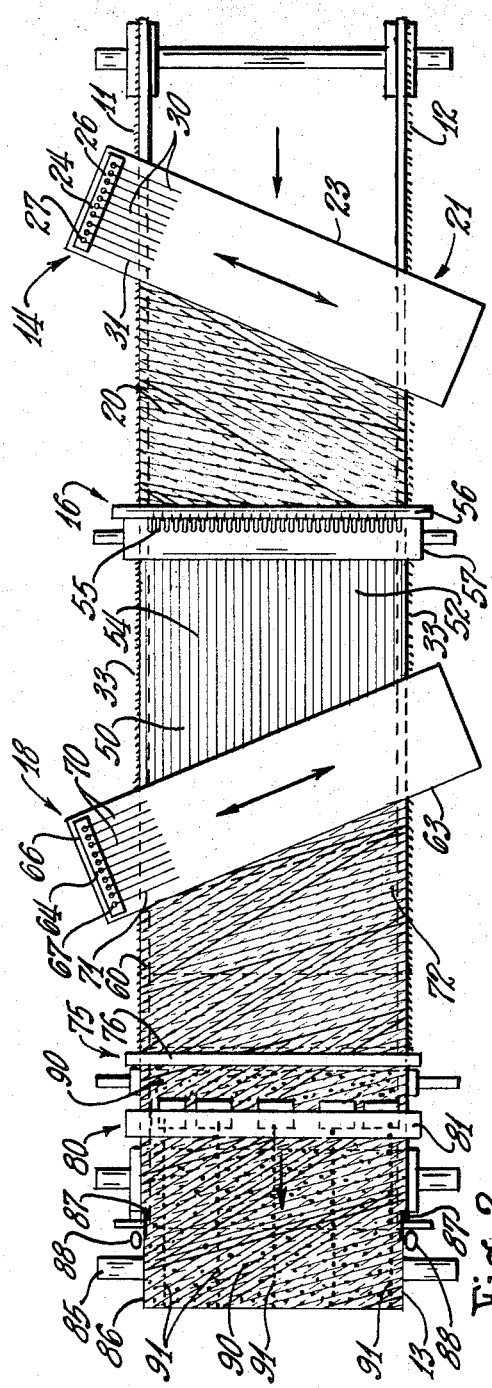
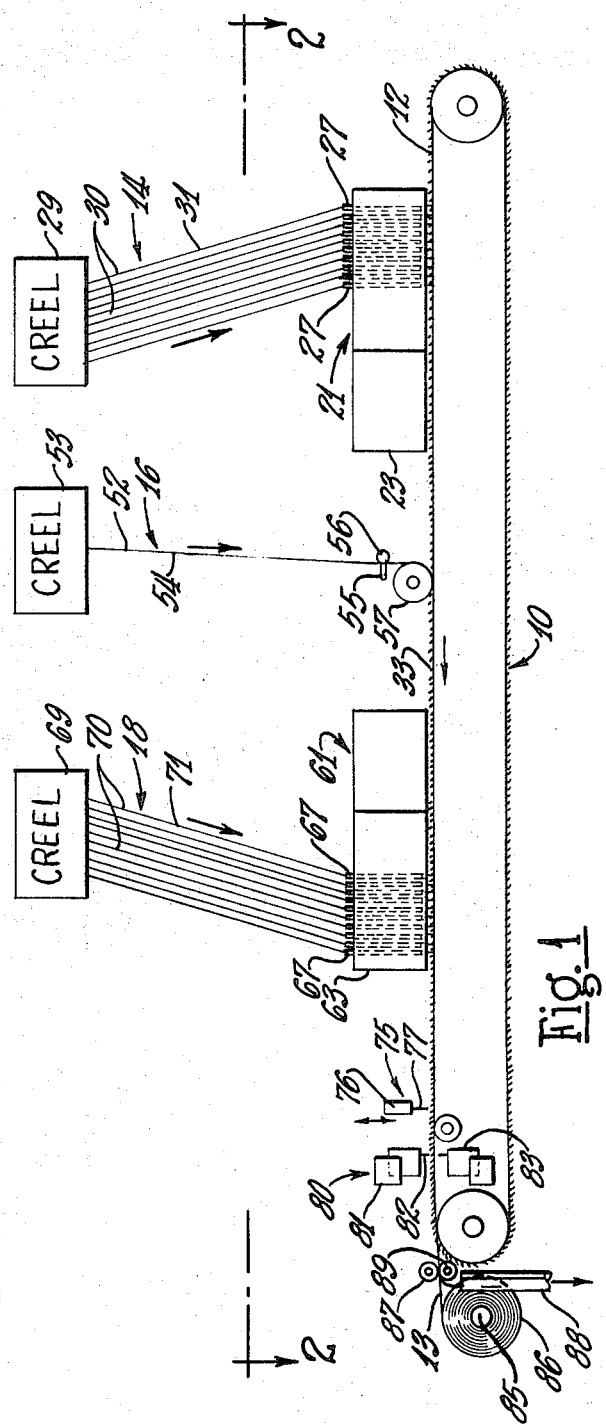
INVENTOR.
ROY E. SMITH
BY
*Staelin & Overman*
ATTORNEYS

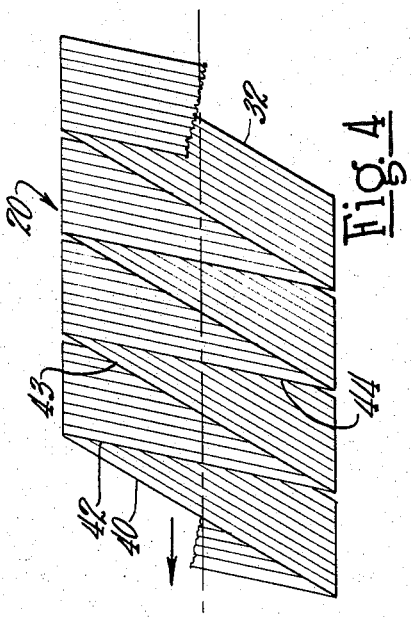
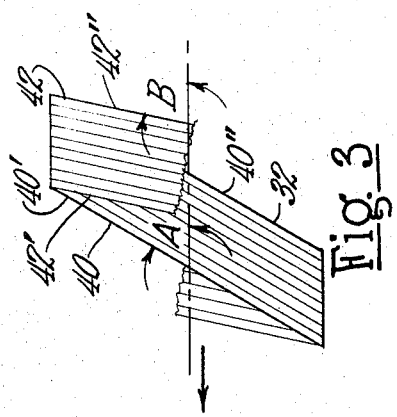
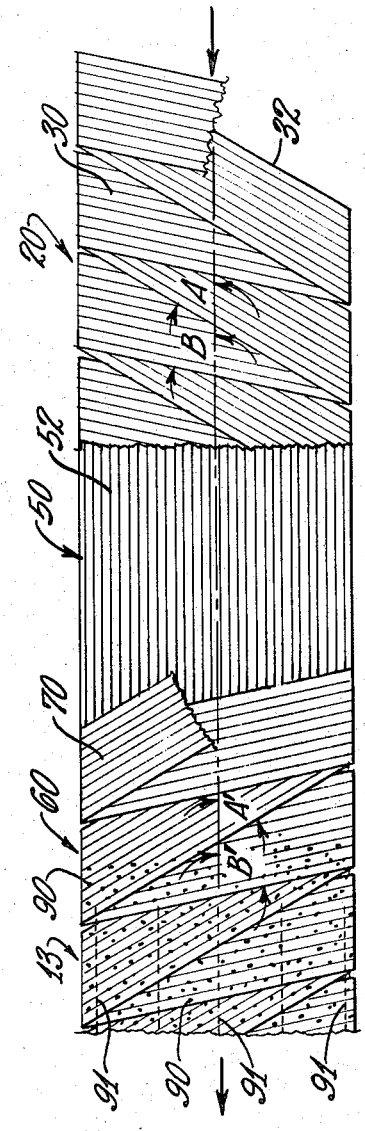

Sept. 25, 1973  R. E. SMITH  3,761,345
NONWOVEN STRUCTURE FOR REINFORCING RESINOUS MATERIAL
Original Filed April 3, 1969  5 Sheets-Sheet 3
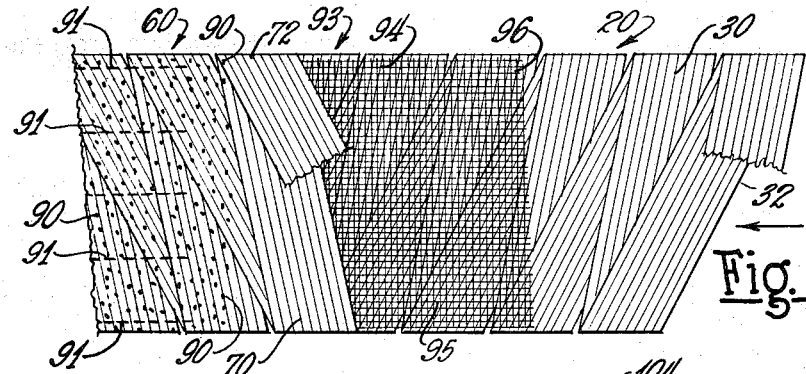
Fig. 6
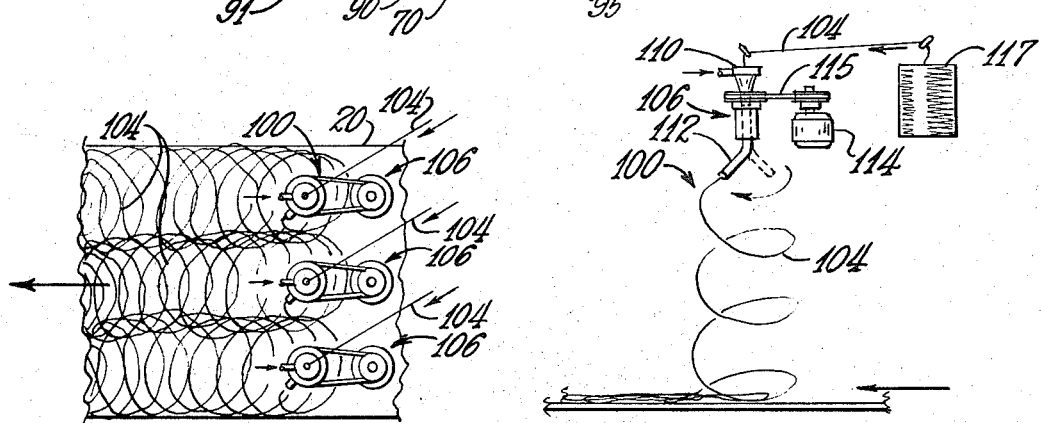
Fig. 7
Fig. 8
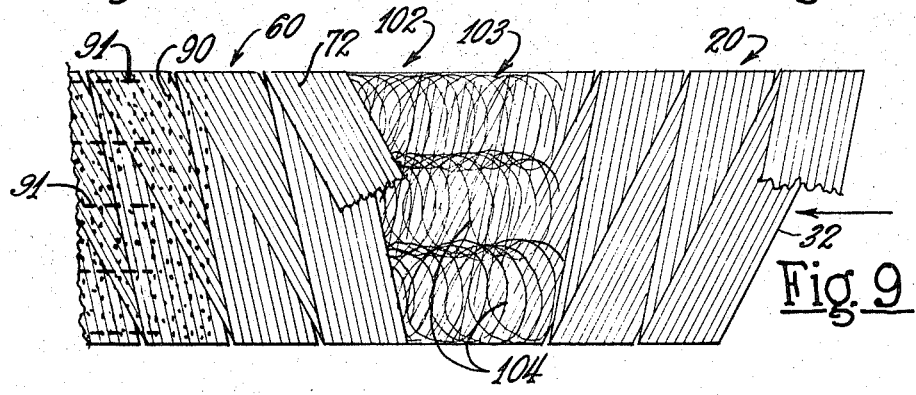
Fig. 9
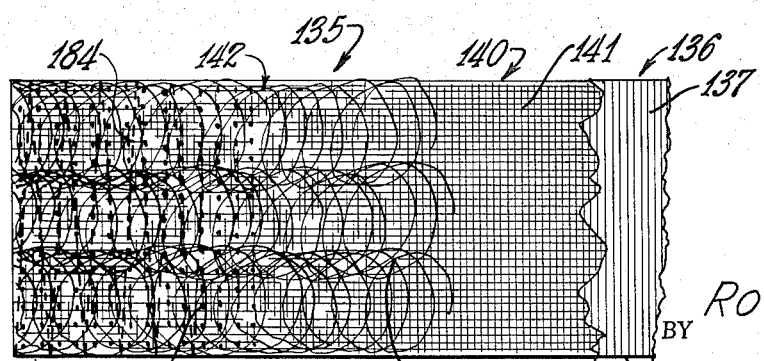
Fig. 12
INVENTOR.
Roy E. Smith
BY Staelin + Overman
ATTORNEYS

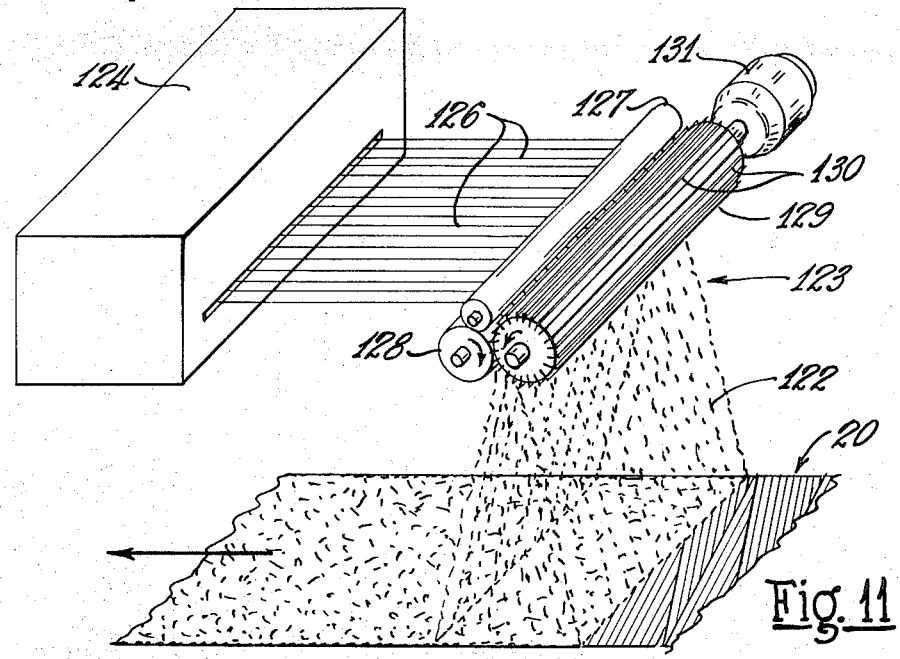
Fig. 11
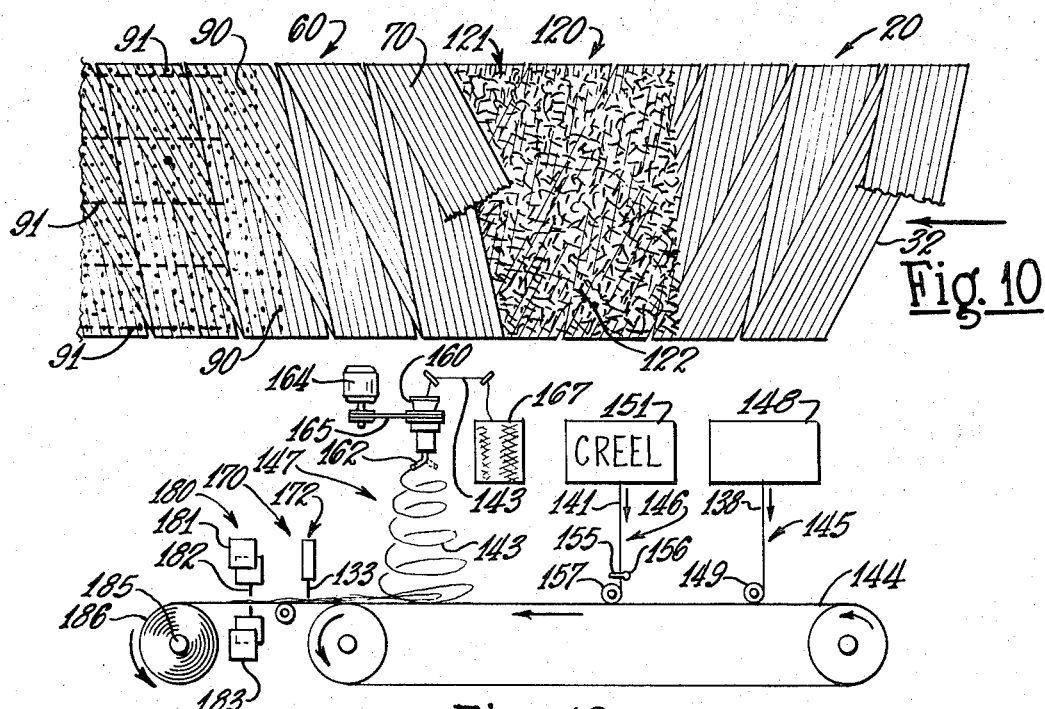
Fig. 10
Fig. 13
INVENTOR.
ROY E. SMITH
BY
*Staelin + Overman*
ATTORNEYS

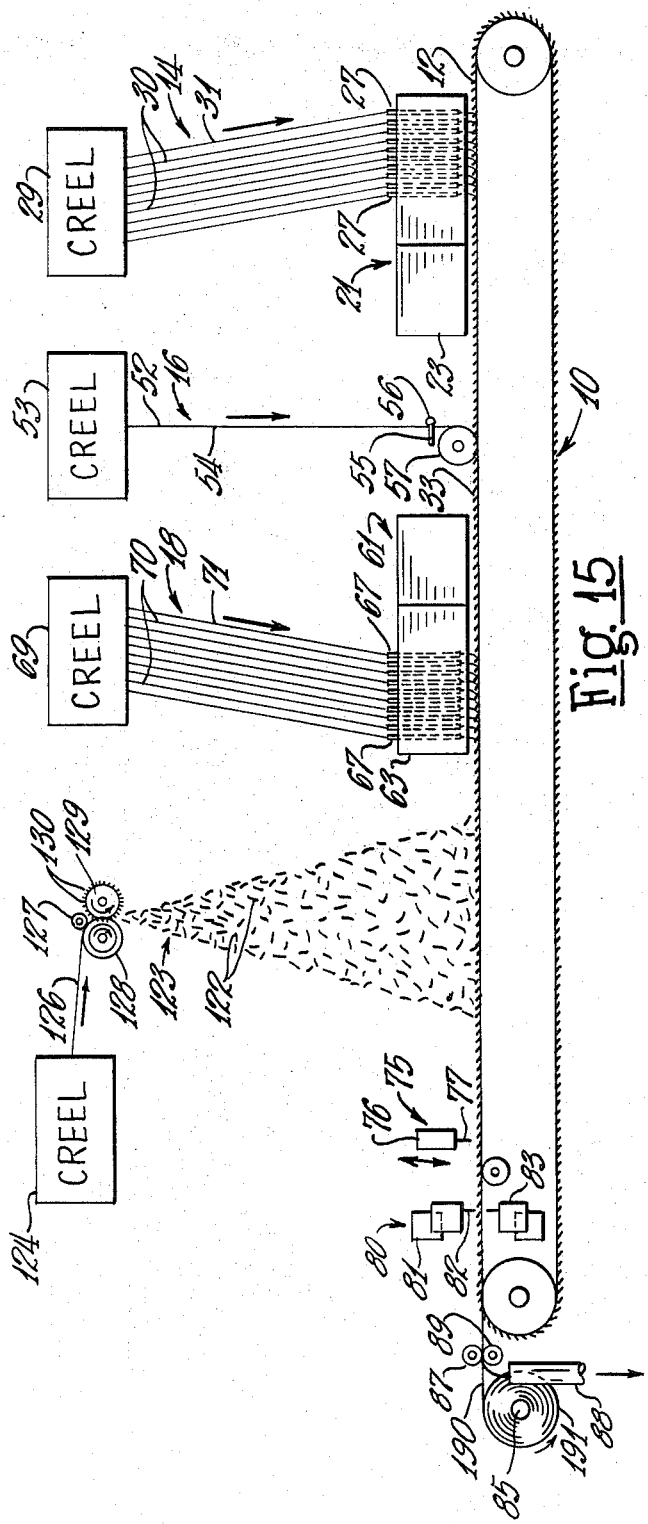

United States Patent Office 3,761,345
Patented Sept. 25, 1973

3,761,345
NONWOVEN STRUCTURE FOR REINFORCING
RESINOUS MATERIAL
Roy E. Smith, 1721 Fallbrook Road, Toledo, Ohio 43614
Continuation of abandoned application Ser. No. 813,218,
Apr. 3, 1969. This application Apr. 16, 1971, Ser.
No. 134,832
Int. Cl. B32b 5/12
U.S. Cl. 161—57
14 Claims

ABSTRACT OF THE DISCLOSURE

A nonwoven structure and apparatus and method for making it where the structure includes successive strips of linear material extending in overlapping relation across it and where the end of each of the strips at one side of the structure is laterally offset in the same direction with respect to the end of each of the strips at the opposite side.

A nonwoven structure and method and apparatus for producing it of which the following is a specification and this application is a continuation of U.S. application Ser. No. 813,218, filed Apr. 3, 1969 and now abandoned.

BACKGROUND OF THE INVENTION

Heretofore, both conventional bonded or glued together nonwoven mats of either continuous linear material or short lengths of linear material such as glass yarns or strands have been subject to severe limitations. While nonwoven mats or structures of chopped or short lengths of linear material provide excellent multidirectional reinforcement for articles made of plastics and the like, the structures are difficult to fabricate within manufacturing specifications. Uncontrolled deviations from manufacturing specifications result in mats possessing nonuniform strength characteristics between different production runs and even having strength variations within the same mat from the same production run. Variation in mat thickness is one example of nonuniformity of manufacture that gives rise to mat strength variations. For example, a bonded mat of chopped glass strands or yarns may vary from manufacturing specifications as much as plus or minus 20% or more, e.g. mat thickness. Further, because manufacturing processes employ resinous glues such as polyesters to bond the linear material together into a coherent body, nonwoven structures or mats of bonded together short strands or yarns are stiff and therefore lack conformability. Also, the resinous glue becomes a barrier to resin absorption by the mat in subsequent operations where the mat is a reinforcement for plastic articles.

While mats of continuous multifilament linear material such as glass strands or glass yarns are manufactured with better control, resulting nonwoven structures or mats do not given the multidirectional strength of the bonded mat of chopped or short lengths and also tend to be too stiff, e.g. poor conformability. Conventional manufacturing apparatus tends to direct the continuous multifilament linear material onto a moving surface such as a moving conveyor in substantially transverse disposition with respect to the movement of the conveyor surface. Thus resulting nonwoven structure or mat does not provide uniform strength in all directions, although the strength of the mat or an article reinforced by the mat or structure may be greater in the direction of the strand lay than a nonwoven structure of chopped or discontinuous linear material. Moreover, because such processes employ resinous glue such as polyesters to bond or adhere the linear material together into a coherent structure, the structures are rigid and do not easily conform in molds. Also, the glue is a barrier to resin absorption by the mat in subsequent operations where the mat is a reinforcement for plastic articles.

SUMMARY OF THE INVENTION

An object of the invention is an improved reinforcement structure and a method and apparatus for producing it that overcomes limitations of the prior art.

Another object of the invention is an improved and more uniformly constructed nonwoven reinforcement structure of linear material having improved multidirectional strength characteristics.

Still another object of the invention is a nonwoven multilayer reinforcement of linear material having improved conformability and better resin absorption characteristics.

Yet another object of the invention is to provide reinforced articles of improved strength.

Other objects and advantages of the invention will become apparent as the invention is hereinafter described in more detail with reference made to the accompanying drawings.

BRIEF DESCRIPTION OF THE DRAWINGS

FIG. 1 is a somewhat simplified view in elevation of a multistation apparatus for manufacturing an improved nonwoven structure of linear material according to the principles of the invention.

FIG. 2 is a plan view of the apparatus shown in FIG. 1.

FIG. 3 is a portion of a layer of a multilayer nonwoven structure of linear material according to the principles of the invention.

FIG. 4 is a more complete showing of the layer of the nonwoven structure illustrated in FIG. 3.

FIG. 5 is a three layer nonwoven structure of linear material according to the principles of the invention employing the layer shown in FIGS. 3 and 4 and produced using the apparatus shown in FIGS. 1 and 2.

FIG. 6 is another three layer nonwoven structure of linear material according to the principles of the invention.

FIG. 7 is a plan view of a modified second station for the multistation apparatus shown in FIGS. 1 and 2 for producing yet another multilayer nonwoven structure according to the principles of the invention.

FIG. 8 is a view in elevation of the modified second station shown in FIG. 7.

FIG. 9 is a portion of the multilayer nonwoven structure produced using the multistation apparatus of FIGS. 1 and 2 modified to employ the second station shown in FIGS. 7 and 8.

FIG. 10 shows still another modified nonwoven reinforcement structure of linear material according to the principles of the invention.

FIG. 11 is a view in perspective of another second station for use with the multistation apparatus shown in FIGS. 1 and 2 where apparatus supplies chopped or short linear material for a layer to produce the structure of FIG. 10.

FIG. 12 shows yet another nonwoven reinforcement structure according to the principles of the invention.

FIG. 13 is a somewhat simplified view in elevation of apparatus for producing the nonwoven structure illustrated in FIG. 12.

FIG. 14 shows a four layer nonwoven structure according to the principles of the invention.

FIG. 15 is a somewhat simplified view in elevation of apparatus for producing the four layer nonwoven structure illustrated in FIG. 14.

DESCRIPTION OF THE PREFERRED EMBODIMENTS

FIGS. 1 and 2 show apparatus for producing a multilayer reinforcement structure according to the principles of the invention using continuous multifilament linear material such as continuous filament glass strands.

While it is preferred to use linear material including bundles of continuous filaments such as continuous filament glass strands, other linear material such as monofilaments may be employed. Further, the invention may use twisted linear material such as continuous filament glass yarn, cord, etc. Moreover, linear material other than glass such as nylon, polyester, and the like may be employed. Also, one may employ linear material of discontinuous or staple filaments, either twisted or untwisted. It may be at times be advantageous to use textured multifilament linear material such as bulky yarn. The use of glass to explain the invention is by way of example only.

While it is not necessary, it is generally preferred to use continuous filament glass strands having a larger number of filaments, e.g. 1600 to 2000 or more filaments; however, linear material having a fewer number of filaments, such as 200 to 800 or more, may be effectively employed and in certain applications may be preferred.

The apparatus shown in FIGS. 1 and 2 includes a strand conveying arrangement such as a tenter 10 providing moving endless tenter belts or chains 11 and 12 that advance by suitable motor and drive means and strand handling apparatus for locating glass strand in predetermined fashion at spaced apart zones to produce reinforcement structure 13 of three layers.

FIGS. 1 and 2 illustrate apparatus for producing the nonwoven reinforcement structure 13 and includes three stations for locating glass strands in predetermined relationship on the tenter 10, one station for each layer of the multilayer nonwoven reinforcement structure 13. The first station 14 includes means for positioning a group or plurality of glass strands into a first or bottom layer of successive strips extending in predetermined overlapping relation running obliquely across the width of the tenter 10 with the glass strands in closely spaced usually touching mutually parallel relationship running lengthwise of the strips. The second station 16 positions a second layer in intimate association on the first layer and includes glass strands extending in closely spaced usually touching mutually parallel relationship lengthwise of the tenter 10. The third station 18 locates a plurality of glass strands in intimate association on the second layer and includes successive strips extending in predetermined overlapping relation running obliquely across the width of the tenter 10 with the glass strands in closely spaced usually touching mutually parallel relationship running lengthwise of the strips.

The first station 14 includes means for traversing a band adjacent mutually parallel glass strands in predetermined relationship to an advancing zone between the moving chains 11 and 12 of the tenter 10, such band folding back and forth across the width of the advancing chains 11 and 12 in overlapping relation to form a bottom or first layer 20. The traversing means includes a carriage unit 21, which has a frame 23 and a carriage 24.

As shown, the frame 23 is a longitudinal box-like unit located above and extending obliquely across the width of the tenter 10 at a predetermined angle to the tenter's center line. The frame 23 holds the carriage 24 in spaced relation above the tenter chains 11 and 12.

The carriage 24 includes a longitudinal guide support 26 extending widthwise of the frame 23 and, in a row, a plurality of side-by-side guide tubes 27 positioned along the length of the support 26. Suitable motor and drive means reciprocates the carriage 24 lengthwise of the frame 23, such reciprocation being oblique to the tenter 10. FIGS. 1 and 2 show the support 26 located horizontally and the guide tubes 27, which pierce the support 26 to open on its upper surface, disposed vertically and depending on the support 26 to terminate just above the plane containing the upper horizontal paths of the chains 11 and 12.

A suitable source such as a creel 29 provides a plurality of continuous filament glass strands 30 to the carriage unit 24. As illustrated in FIGS. 1 and 2 the strands 30 advance as a band 31 from the creel 29, which is located in spaced relation from the tenter 10 and carriage unit 24. The strands 30 travel individually through the guide tubes 27.

The speed of the advancing endless chains 11 and 12 and the traversing speed of the carriage 24 on the frame 23 are in proportion to orient the band 31 of glass strands 30 in fixed relation across the chains. The band 31 forms successive strips 32 extending obliquely in folded overlapping relation across the tenter 10 (the reinforcement structure 13). These strips 32 form two groups of alternate strips where each of the groups extends from one side of the layer 20 to the opposite side toward a third side, viz. an end. Each of the two groups of strips extend at different angles. The disposition of the strips places the end of each of the strips at one side of the layer 20 laterally offset in the same direction with respect to the end of each of the strips at the opposite side. The strands 30 run lengthwise within each of the strips 32 to extend at the same predetermined angle to the center line of the tenter 10 (also to the center line of the layer 20) as the strips 32.

Suitable means on the chains 11 and 12 engage or grab each of the strands 30 to hold them in fixed predetermined relation as the carriage 24 traverses the strands 30 across the advancing zone between the chains. The FIGS. 1 and 2 illustrate pins or hooks 33 on the chains 11 and 12. As the carriage 24 reciprocates, the guide tubes 27 position each of the strands 30, at the end of each traversing stroke, in front of an advancing hook 33, which engages each of the properly located strands 30 to capture the strand and move the strand forward with it. As the carriage 24 moves to orient a succeeding portion of the band 31 as a strip 32 across the width of the tenter 10, the individual strands 30 are drawn somewhat taut.

From FIGS. 3 through 5 it can be seen that the band 31 of glass strands 30 runs back and forth obliquely across the width of the tenter 10 in overlapping relation to form the strips 32 comprising the bottom layer 20. FIGS. 3 and 4 more clearly illustrate the folded and overlapping disposition of the strips 32 that continues throughout the layer 20 where an initial strip portion 40 extends obliquely across the width of the tenter 10 (between the hooks 33 on the endless chains 11 and 12). The initial strip portion 40 has a leading edge 40', a trailing edge 40" and a plurality of closely associated or adjacent mutually parallel glass strands 30 extending lengthwise therein. The strip 40 forms an angle A with the center line of the layer 20 and the tenter 10. As the carriage 24 traverses the band 31 of strands 30 obliquely across the tenter 10 to lay the initial strip portion 40 between the chains 11 and 12, each strand 30 turns or is captured on an associated hook 33 and pulled somewhat taut. The carriage 24 moves the strands 30 together obliquely back across the width of the tenter 10 to form a second strip portion 42 with a leading edge 42' and a trailing edge 42". In relation to the initial strip portion 40 the strip 42 is located such that its leading edge 42' converges on the trailing edge 40". While the ends of the strips 32 may terminate on the chains 11 and 12 in substantially adjacent side-by-side relationship or registry, the adjacent corners of the strip ends may be touching or in overlapping relation.

The leading edge 42', trailing edge 42", and all glass strands 30 within the strip portion of 42 form an angle B with the center line of the tenter 10, the longitudinal layer 20 and the structure 13. As shown, the angle B is larger than an angle A. The frame 23 is rotatably mounted to permit changes in angles A and B. While angle A can vary, it is normally in the range of from 30 to 85 degrees. The magnitude of the angle A depends upon the needs of the structure 13. The angle B also varies, its magnitude depending on such things as the width of the band 31 and distance between the chains 11 and 12 of the tenter 10.

The third strip portion 43 of the band 31 overlaps the second strip portion 42 and is disposed exactly like the initial strip portion 40, e.g. makes an angle A with the center line of the tenter 10; the third strip portion 43 extends parallel to the initial strip portion 40. The fourth strip portion 44 of the band 31 overlaps the third strip portion 43 and is disposed exactly like the second strip portion 42, e.g. makes an angle B with the center line of the layer 20 and the tenter 10; however, the fourth portion 44 extends parallel to the second portion of 42. The remaining portions of the layer 20 include overlapping strips 32 as described with respect to the strip portions 40 through 44. Thus, layer 20 comprises two groups of alternate strips where each of the groups extends from one side of the layer 20, i.e. structure 13, to the opposite side of the layer 20 toward a third side, i.e. one end of the layer, at different predetermined angles, i.e. angles A and B. Every other strip 32, e.g. strip portions 40 and 42, combine to form a continuous overlapped disposition of adjacent mutually parallel glass strands throughout the length of the layer 20 wherein each strand extends obliquely across its width at either an angle A or an angle B. Hence, the first layer 20 comprises a plurality of successive strips extending in overlapping relation across the layer where the end of each of the strips 32 at one side of the layer are positioned in lateral offset relation in the same direction with respect to the end of each of the strips 32 at the opposite side.

The second station 16 provides means to dispose a second layer 50 in intimate association on the first layer 20. As shown in FIGS. 1 and 2 a suitable source such as a creel 53 located in spaced relation from the tenter 10 provides a plurality of parallel glass strands 52. From the creel 53 the glass strands 52 travel as a band or sheet 54 of parallel strands 52 to pass individually between guides 55 of a guide member 56 and thence turn under a rotatably mounted longitudinal roll 57 extending across the width of the tenter 10. The longitudinal roll 57 is in close association with the advancing first layer 20. As the strands 52 turn under the longitudinal roll 57, they dispose themselves as adjacent mutually parallel normally touching strands running lengthwise of the tenter 10 and layer 50, i.e. extending parallel to the center line of the nonwoven structure 13.

The third strand laying station 18 provides means for traversing a band of adjacent mutually parallel glass strands to form a third or top layer 60 of the nonwoven reinforcement structure 13. In FIGS. 1 and 2 such means include a carriage unit 62, which further includes a frame 63 and a carriage 64.

The frame 63 is a longitudinal box-like unit above and extending obliquely across the width of the tenter 10. The frame 63 extends at a predetermined angle to the center line of the tenter 10 and holds the carriage 64 in spaced relation from the tenter chains 11 and 12. As in the case of the frame 23 the frame 63 is rotatably mounted.

As illustrated the carriage 64 includes a longitudinal support 66 extending widthwise of the frame 63 and in a row a plurality of side-by-side guide tubes 67 on the support 66. Suitable motor and drive means reciprocates the carriage 64 lengthwise of the frame 63. The carriage 64 locates the support 66 horizontally and the guide tubes 67, which open on the upper surface of the support 66, depend vertically on the support 66 to terminate just above the plane containing the upper horizontal paths of the chains 11 and 12.

As in the case of the first strand disposing station 14 a suitable source such as a creel 69 provides a plurality of continuous filament glass strands 70 to the carriage unit 62. The strands 70 advance as a band 71 from the creel 69, which is in spaced relation from the tenter 10 and carriage unit 62, to travel individually through the guide tubes 67.

The speed of the reciprocating carriage 64 and the speed of the advancing endless chains 11 and 12 (hooks 33) are proportioned to dispose the band 71 as strips 72 of adjacent mutually parallel glass strands 70 in obliquely extending and overlapping relation across the width of the tenter 10 as discussed in relation to the overlapping relationship of the strips 32 comprising the bottom layer 20, except the strips 72 extend in another direction, i.e. to the left of the center line at the angles A' and B' as indicated in FIG. 5. Angles A' and B' agree with angles A and B, which extend to the right of the center line in FIG. 5. The third layer 60 is in communication with the second layer 50 and is separated from the first layer 20 by the second and intermediate layer 50.

The three combined layers, i.e. layers 20, 50 and 60, advance together to a needling station 75, which includes a needling machine 76 having a plurality of vertically oriented needles 77 extending in a row across the width of the tenter 10. The needles 77, which are normally without hooked ends, move in and out of the multilayer structure 13 to punch a plurality of openings through the layers, such needling also somewhat separating the filaments of the strands in the region of the openings to further reduce the time required for resin absorption or "wet-out" during subsequent manufacturing steps of producing a glass reinforced article.

After the needling station 75 the needled layers advance to a stitching station 80 comprising stitching or sewing machines 81 located across the width of the tenter 10 and having a plurality of sewing needles 82, each of which provide a stitched pattern to nonadhesively join the three layers together. Below the layers is a multi-bobbin and shuttle assembly 83 working to form a two-thread lock stitch. While FIGS. 1 and 2 show the sewing machine 81 providing a straight line stitch, a zig-zag stitch may also be effectively employed. Other sewing stitches such as single or double thread cable stitch may also be used. Moreover, one can use a knitted stitch to join the layers. The thread may be of a character that dissolves under the influence of resins subsequently used with the structure 13. Further, to improve the conformability of the structure it has been useful to employ thread of unstretched thermoplastic material, e.g. thread of unstretched polyester filaments.

Suitable motor and drive means rotates a collection mandrel 85 to collect the structure 13 into a package 86.

The apparatus includes means that trims the longitudinal edges of the structure 13. Such means includes cooperating disc cutter 87 and arbor 89 and air suction tubes 88 located at the edges of the tenter 10 between the package 86 and stitching station 80. The edges of the structure 13 pass between the disc cutters 87 and associated arbor 89 at the zone where the chains 11 and 12 begin to reverse their direction of movement. As the discs 87 cut the strands of the structure 13 at its lengthwise edges, the structure 13 is freed from the hooks 33. The air suction tubes 88 receive the scrap strand and remove it to a remote scrap collection location.

In operation the apparatus shown in FIGS. 1 and 2 produces a three layer nonwoven reinforcement structure joined together without adhesives. At the first station 14 the apparatus advances a plurality of glass strands 30 to a first advancing zone between opposite edges of the zone (the hooks 33) and traverses the strands 30 together across the zone along a path obliquely of the zone's direction of movement. The speed of the zone, i.e. speed of the hooks 33, is proportional to the traversing speed to form successive strips 32 of the strands 30 extending obliquely in overlapping relation across the layer 20 in the form of two groups of alternate strips with one end of each of the strips 32 in lateral offset relation in the direction of zone movement from the other end of each of the strips 32. The apparatus orients the groups of alternate strips to extend at predetermined angles A and B with the center line of the layer 20 with the strands 30 extending lengthwise of the strips 32.

The apparatus of the second station 16 advances the strands 52 onto the moving first layer 20 at a second advancing zone to form the second layer 50 having the strands extending in mutually parallel usually touching relationship lengthwise of the tenter 10.

The apparatus of the third station 18 advances a plurality of glass strands 70 to form the third layer 60 on the second layer 50 at a third advancing zone by traversing the strands 70 together obliquely between opposite edges of the zone (the hooks 33). As in the case of the first station 14 the traversing speed and speed of the third zone (hooks 33) are proportioned to orient the filaments 70 into successive strips 72 extending obliquely in overlapping relation across the layer in the form of two groups of alternate strips with one end of each of the strips in lateral offset relation in the direction of zone movement from the other end of each of the strips. The angles A' and B' of the third layer 50 agree with the angles A and B of the first layer 20.

FIG. 5 shows the nonwoven structure 13 with the needle holes denoted as 90 and stitching denoted as 91.

FIG. 6 shows a modified nonwoven structure 93 of the invention, which can be produced with the apparatus of FIGS. 1 and 2 by merely removing or by-passing the guide member 56. While the bottom layer 20 and the top layer 60 are the same as found in the nonwoven structure 13, the middle layer is different. In lieu of the sheet 54 of adjacent mutually parallel strands 52 the structure 93 employs a middle layer 94, which is a fabric of parallel warp yarns 95 and parallel woof yarns 96. The middle layer 94 may be either woven or nonwoven. The fabric 94 runs between the roller 57, which disposes the fabric 94 in intimate association on the first layer 20 with its warp yarn 95 extending lengthwise of the structure 93 of its woof yarn 96 extending across the width of the structure 93. As the structure 13, the structure 93 is needled to have needle holes 90 and joined by stitching 91.

FIG. 9 illustrates yet another form of a nonwoven structure of the invention. Shown is a three layer nonwoven reinforcement structure 102 having the layer 20 as its bottom layer and the layer 60 as its top layer. A middle layer 103 is made of strands 104 disposed in whorls or loops. Moveover, the entire structure 102 is needled to have needle openings 90 and is joined by stitching 91.

FIGS. 7 and 8 illustrate a modified second station used with the apparatus of FIGS. 1 and 2 in place of the second station 14 to produce the second layer 103 of the nonwoven structure 102. Shown is a second station 100, which operates in cooperation with the first station 14 and the third station 18 and comprises a plurality of spaced apart side-by-side strand looping devices 106 positioned widthwise of the tenter 10. Each of the strand looping devices 106 directs a strand 104 in looped or whorled disposition onto the advancing bottom layer 20.

Each of the strand looping devices 106 includes an air nozzle 110 that directs a stream of air into the entrance end of a bent guide tube 112, and an electrical motor 114 rotates the bent tube 112 through a belt 115, such rotation moving the outward end of the tube 112 through a circular path.

In operation each of the strand looping devices 106 advances a strand 104 from a suitable source such as a serving package 117 onto the moving layer 20 in a looped disposition. The strand 104 travels from the serving package 117 into the entrance end of the air nozzle 110, which advances the strand 104 through the bent guide tube 112. As the strand 104 exists at the outlet end of the guide tube 112, the circular motion of the outlet end of the tube 112 imparts loops or whorls to strand. As each of the strands 104 falls onto the moving layer 20, it collects as a substantially planar column of looped or whorled strands lengthwise on the moving layer 20.

Each of the other strand looping devices 106 operate similarly to produce columns of looped strands, which may somewhat overlap along their lengthwise edges.

FIG. 10 shows still another modified nonwoven structure 120 according to the invention comprising the first or bottom layer 20, a middle layer 121 and the top or third layer 60. The bottom layer 20 and the top layer 60 are the bottom and top layers of the nonwoven structure 13, 93 and 102. The middle or second layer 121 comprises short bundles of glass fibers 122 in promiscuous disposition. While the bundles of glass fibers may be wet, it is preferred that they be dry.

FIG. 11 shows a modified second station 123 for use with the apparatus illustrated in FIGS. 1 and 2 to produce the middle layer 121. The second station 123 employs strand cutting apparatus, which includes a strand supply and strand chopping unit. The strand supply is a creel 124 providing a plurality of parallel side-by-side strands 126. The strand chopping unit is a longitudinal unit extending the width of the tenter 10 and includes cooperating strand advancing nip rolls 127 and 128 and a longitudinal cylindrical cutting roll 129 having radially extending cutting blades 130. As illustrated the nip roll 128 is of larger diameter than the nip roll 127. A motor 131 drives the cutting roll 129. The cutting blades 130 of the roll 129 engage the larger nip roll 128, which functions as a cot or cutting surface against which the blades 130 may press. The cutting roll 129 drives the nip rolls 127 and 128 in rotation.

In operation the second station 123 cuts the strands 126 to rain short lengths of glass fiber bundles 122 in promiscuous array onto the advancing first layer 20. The continuous filament glass strands 126 travel from the creel 124 to move between the strand advancing nip rolls 127 and 128 and thence between the larger nip roll 128 and cutting roll 129. As the strands 126 pass between the nip roll 128 and cutting roll 129, the cutting blades 130 engage them against the surface of the nip roll 128 to cut the strands 126 into the short strand lengths 122. Normally the short strand lengths 122 are in the range of from 1 inch to 10 inches, 2 inches being preferred.

After the short lengths of glass strand 122 have been deposited on the moving first layer 20, the third station 18 positions the third or top layer 60 in intimate association on the second layer 121. Moreover, as in the case of the nonwoven structures 13, 93 and 102, the nonwoven structure 120 passes across the needling station 75 to receive needle holes 90 and immediately thereafter traverses the stitching station 80 for joining the layers together by stitching 91.

FIG. 12 shows another form of the nonwoven structure of the invention, viz. a three layer nonwoven structure 135. The first or bottom layer 136 includes a plurality of linear material or glass strands 137 on a carrier sheet 138 where the strands 137 extend transverse of the nonwoven structure 135. The second layer 140 includes a plurality of mutually parallel strands 141 extending lengthwise of the structure 135. The third or top layer 142 includes looped strands 143.

FIG. 13 illustrates apparatus for making the nonwoven structure 135 shown in FIG. 12. The apparatus includes three stations for locating linear material, e.g. glass strands, in predetermined relationship on a continuous moving belt 144, one station for each layer of the structure 135. The first station 145 includes means for positioning the strands 137 at a moving zone as the first or bottom layer 136 with the strands 137 in adjacent mutually parallel relationship running transverse of the belt 144. The second station 146 positions the second or middle layer 140 at a second moving zone on the first layer 136 with the strands 141 extending in closely spaced mutually parallel relationship lengthwise of the belt 144. The third station 147 directs the strands 143 onto the advancing third layer 142 in looped configuration at a third moving zone.

The first station 145 provides means to direct the layer 136 in predetermined relationship on the moving continuous belt 144. As shown in FIG. 11 a suitable source 148 located in spaced relation above the belt 144 provides a plurality of mutually parallel strands 137 on the carrier sheet 138. The carrier sheet 138 may be suitable material such as glass web, plastic film or paper. From the creel 148 the strands 137 on the carrier sheet 138 advance downwardly to turn under a rotatably mounted longitudinal roll 149 extending across the width of the belt 144. The longitudinal roll 149 is in close association with the advancing endless belt 144. As the carrier sheet 138 and strands 137 turn under the longitudinal roll 149, the sheet 138 disposes the strands 137 to extend widthwise of the belt 144. Other means to dispose the strands 137 widthwise of the belt 144 without a carrier sheet may be employed.

The second station 146 provides means to dispose the second layer 140 in predetermined relationship at a second zone and in intimate association on the first layer 136. As shown in FIG. 13 a suitable source such as a creel 151 located in spaced relation above the endless belt 144 provides a plurality of parallel strands 141. From the creel 151 the strands 141 advance downwardly as a sheet of oriented parallel strands to pass individually between guides 155 of a guide member 156 and thence turn under a rotatably mounted longitudinal roll 157 extending across the width of the endless belt 144. The longitudinal roll 157 is in close association with the first layer 136. As the strands 141 turn under the longitudinal roll 157, they are disposed as adjacent mutually parallel strands running lengthwise of the endless belt 144, i.e. extending lengthwise of the nonwoven structure 135 being produced.

The third strand laying station 147 provides means for orienting the strands 130 at a third zone in a whorled pattern that forms the third or top layer 142 of the nonwoven reinforcement structure 135. As in the case of the apparatus shown in FIGS. 7 and 8, the third station 147 includes a plurality of air nozzles 160 where each of the nozzles is communicating with the entrance end of a rotatable bent tube 162. In operation, each of the strands 130 travels from a serving package 167 and is advanced by the air nozzle 160 into the bent tube 162. A suitable motor 164 through a drive belt 165 rotates the bent tube 162 to whorl each of the strands 130 as described in relation to the apparatus shown in FIGS. 7 and 8. Moreover, the apparatus of the third station 147 can include up to three or more separate devices.

The three combined layers, i.e. layers 136, 140 and 142, advance together to a needling station 170, which includes a needling machine 172 having a plurality of vertically oriented needles 173 extending in a row across the width of the endless belt 144. The needles 173, which are normally without hooked ends, move into the multi-layer oriented strand composite structure 135 to punch a plurality of openings 175, such needling separating the filaments of the strand in the zone of puncture and tending to open the structure 135 for faster resin absorption in subsequent manufacture of glass reinforced resin articles.

After the needling station the needled nonwoven structure 135 advances to a stitching station 180 comprising a stitching or sewing machine 181 extending across the width of the structure 135 and having a plurality of sewing needles 182, each of which provides zig-zag stitching 184 nonadhesively joining the three layers together. Below the structure 135 is a multi-bobbin and shuttle assembly 183 to form a two-threaded lock stitch.

A collection mandrel 185 takes the needled and stitched together nonwoven structure 135 from the endless belt 144 as a package 186.

FIG. 14 illustrates a four layer nonwoven structure according to the invention. The nonwoven structure 190 has the layer 20 as its first or outer layer, the second layer 50 and the third layer 60. These layers are the layers shown in FIGS. 2 and 5 and comprise the nonwoven structure 13. The top and outer layer of the nonwoven structure 190 is the layer 121 including the plurality of short chopped promiscuously disposed chopped glass strands 122 forming a part of the nonwoven structure 120 shown in FIG. 10 and produced employing the apparatus shown in FIG. 11. The structure 190 has needle openings 90 and is nonadhesively joined together by spaced apart stitching 91, the stitching being disposed sufficiently close to hold the layer 121 together as a coherent body.

FIG. 15 illustrates an apparatus representing a four station process of manufacturing the nonwoven structure 190 shown in FIG. 14. The apparatus employs the first station 14, second station 16 and the third station 18 of FIGS. 1 and 2. Station four is the apparatus of the modified second station 123 illustrated in FIG. 11.

At the first station 14 the apparatus advances the plurality of glass strands 30 to a first advancing zone between the moving hooks 33 of the tenter 10 and traverses the strands 30 together across the zone obliquely of the zone's direction of movement. The speed of the zone (i.e. speed of the hooks 33) is proportional to the traversing speed to form successive strips 32 extending obliquely in overlapping relation across the layer 20 in the form of two groups of alternate strips with one end of each of the strips 32 in lateral offset relation in the same direction with respect to the outer end of each of the strips. The strands 30 extend lengthwise of the strips 32.

The apparatus of the second station 16 locates the strands 52 in a mutually parallel usually touching relationship lengthwise of the structure 13 on the moving first layer 20 at a second advancing zone to form the second layer 50.

The apparatus of the third station 18 advances a plurality of glass strands 70 onto the second layer 50 at a third advancing zone and traverses the strand obliquely across the zone between the moving hooks 33. The traversing speed and speed of the third zone are proportioned to orient the filaments 70 into the successive strips 72 extending obliquely in overlapping relation across the layer in the form of two groups of alternate strips with one end of each of the strips in lateral offset relation in the same direction with respect to the end of each of the strips.

The fourth station 123 cuts the strands 126 to rain short lengths of glass fiber bundles 12 in promiscuous array onto the advancing layers. The continuous filament glass strands 126 travel from the creel 124 to move between strand advancing nip rolls 127 and 128 and thence between the nip roll 128 and cutting roll 129. As the strands 126 pass between the nip roll 128 and cutting roll 129, the blades 130 engage the strands against the surface of the nip roll 128 to cut them into short strand lengths 122. Normally the short strand lengths 122 are in the range from 1 inch to 10 inches in length, 2 inches being preferred.

The four layers advance from station four to the needling station 75. As the layers pass across station 75 the needling machine 76 punctures the plurality of openings in the layers as discussed with relation to the nonwoven structure 13.

After the needling station 75 the layers pass or advance to the stitching station 80. Sewing machines 81 nonadhesively joins the layers together.

Suitable means rotates the collection mandrel 85 to wind the nonwoven structure 190 as a package 191.

It is apparent that, within the scope of the invention, modifications and different arrangements may be made other than as herein disclosed. The present disclosure is merely illustrative, the invention comprehending all variations thereof.

I claim:

1. A nonwoven structure for reinforcing resinous material combined therewith comprising:
   a layer including a longitudinal grouping of mutually parallel continuous linear elements extending lengthwise of such grouping, the longitudinal grouping being folded into successive strips extending in overlapping relation back and forth across the layer, the end of each of the strips at one side of the structure being positioned in lateral offset relation in the same direction with respect to the other end of each of the strips at the opposite side of the structure, the ends of alternate strips being in adjacent side-by-side relationship, the continuous linear elements of all the overlapping strips being in touching relationship; and thread interengaging the strips effectively joining them together into an integral structure.

2. A nonwoven structure recited in claim 1 wherein the ends of alternate strips are in substantially side-by-side registry at the sides of the structure.

3. A nonwoven structure recited in claim 2 where the linear elements are multifilament textile elements.

4. A nonwoven structure for reinforcing resinous material combined therewith comprising:

a longitudinal layer including a longitudinal grouping of continuous longitudinal elements folded into a plurality of successive strips extending back and forth in overlapping relation across the width of the layer, the strips comprising two groups of strips, of each of the groups being oriented obliquely with respect to a common side to extend therefrom each group at a different acute angle towards a common end of the layer, the strips of each of the groups extending generally parallel to each other in adjacent side-by-side relationship with their continuous longitudinal elements extending in mutually parallel relation lengthwise of such strips across the entire width thereof, the continuous linear elements of all the overlapping strips being in touching relationship; and thread interengaging the strips effectively joining them together into an integral structure.

5. A multilayer nonwoven structure for reinforcing resinous material combined therewith comprising:

a longitudinal layer including a longitudinal grouping of glass strands folded back and forth into a plurality of successive strips extending in overlapping relation across the width of the layer, the strips comprising two groups being oriented obliquely with respect to a common side to extend therefrom each group at a different acute angle towards a common end of the layer, the strips of each of the groups extending generally parallel to each other in adjacent side-by-side relationship with their glass strands extending in adjacent mutually parallel relation lengthwise of the strips across the entire width thereof, the glass strands of all the overlapping strips being in touching relationship;

another layer including a plurality of mutually parallel glass strands extending lengthwise of the structure; and thread interengaging the layers effectively joining them together into an integral structure.

6. A multilayer nonwoven structure recited in claim 5 wherein the other layer further includes a second plurality of mutually parallel glass strands running between the opposite sides.

7. A multilayer nonwoven structure as recited in claim 6 wherein the plurality of mutually parallel glass strands and the second plurality of mutually parallel glass strands of the other layer are at right angles to each other.

8. A multilayer nonwoven structure for reinforcing resinous material combined therewith comprising:

a longitudinal layer including a continuous group of glass strands folded back and forth into a plurality of successive strips extending in overlapping relation across the width of the layer, the strips comprising two groups of strips, the strips of each of the groups being oriented obliquely with respect to a common side to extend therefrom each group at a different acute angle towards a common end of the layer, the strips of each of the groups extending generally parallel to each other in adjacent side-by-side relationship with their glass strands extending in adjacent mutually parallel relation lengthwise of the strips across the entire width thereof, the glass strands of all the overlapping strips being in touching relationship;

another layer including a plurality of whorled glass strands; and thread interengaging the layers effectively joining them together into an integral structure.

9. A multilayer nonwoven structure for reinforcing resinous material combined therewith comprising:

a longitudinal layer including a continuous group of glass strands folded into a plurality of successive strips extending in overlapping relation across the width of the layer, the strips comprising two groups of strips, the strip in each of the groups being oriented obliquely with respect to a common side to extend therefrom each group at a different acute angle towards a common end of the layer, the strips of each of the groups extending generally parallel to each other in adjacent side-by-side relationship with their glass strands extending in adjacent mutually parallel relation lengthwise of the strips across the entire width thereof, the glass strands of all the overlapping strips being in touching relationship;

another layer including short promiscuously disposed short glass strands; and thread interengaging the layers effective to join them together into an integral structure.

10. A longitudinal multilayer nonwoven structure for reinforcing resinous material combined therewith comprising:

a first longitudinal layer including a continuous grouping of glass strands folded into a plurality of successive strips extending in overlapping relation across the width of the structure, the strips comprising two groups of strips, the strips of each of the groups being oriented obliquely with respect to a common side to extend therefrom each group at different acute angle toward a common end of the layer, the strips of each of the groups extending generally parallel to each other in adjacent side-by-side relationship with their glass strands extending in adjacent mutually parallel relation lengthwise of the strips across the entire width thereof, the glass strands of all the overlapping strips in the first longitudinal layer being in touching relationship;

a second longitudinal layer in communication with the first layer including a plurality of mutually parallel glass strands running lengthwise of the structure;

a third longitudinal layer in communication with the second layer and separated from the first layer by the second layer, the third layer including a continuous grouping of glass strands folded into a plurality of strips extending in overlapping relation across the width of the structure, the strips comprising two groups of strips, the strips of each of the groups being oriented obliquely with respect to a side corresponding to the side opposite the common side of the first layer to extend from such corresponding side each group at an acute angle agreeing with the acute angle of the corresponding group in the first layer towards an end corresponding to an end opposite the common end, the strips of each of the groups of the third layer extending generally parallel to each other in adjacent side-by-side relationship with their glass strands extending in adjacent mutually parallel relation lengthwise of the strips, the glass strands of all the overlapping strips in the second longitudinal layer being in touching relationship; and thread interengaging the layers effectively joining them together into an integral structure.

11. A longitudinal multilayer nonwoven structure for reinforcing resinous material combined therewith comprising:

a first longitudinal layer including a continuous grouping of glass strands folded into a plurality of successive strips extending in overlapping relation across the width of the structure, the strips comprising two groups of strips, the groups being oriented obliquely with respect to a common side to extend therefrom each group at a different acute angle towards a common end of the layer, the strips of each of the groups extending generally parallel to each other in adjacent side-by-side relationship with their glass strands extending in generally mutually parallel relation lengthwise of the strips, the glass strands of all the overlapping strips in the first longitudinal layer being in touching relationship;

a second longitudinal layer in communication with the first layer including a plurality of whorled glass strands;

a third longitudinal layer in communication with the second layer and separated from the first layer by the second layer, the third layer including a continuous grouping of glass strands folded into a plurality of strips extending in overlapping relation across the width of the structure, the strips comprising two groups of strips, the groups being oriented obliquely with respect to a side corresponding to the side opposite the common side of the first layer to extend from such corresponding side each group at an acute angle agreeing with the acute angle of the corresponding group in the first layer towards an end of the third layer corresponding to an end opposite the common end, the strips of each of the groups of the third layer extending generally parallel to each other in adjacent side-by-side relationship with their glass strands extending in adjacent mutually parallel relation lengthwise of the strips, the glass strands of all the overlapping strips in the second longitudinal layer being in touching relationship; and thread interengaging the layers effectively joining them together into an integral structure.

12. A longitudinal multilayer nonwoven structure for reinforcing resinous material combined therewith comprising:

a first longitudinal layer including a continuous grouping of glass strands folded into a plurality of successive strips extending in overlapping relation across the width of the structure, the strips comprising two groups of strips, the groups being oriented obliquely with respect to the common side to extend therefrom each group at a different acute angle toward a common end of the layer, the strips of each of the groups extending generally parallel to each other in side-by-side relationship with their glass strands extending in generally mutually parallel relation lengthwise of the strips, the glass strands of all the overlapping strips in the first longitudinal layer being in touching relationship;

a second longitudinal layer in communication with the first layer including a plurality of short promiscuously disposed chopped glass strands;

a third longitudinal layer in communication with the second layer and separated from the first layer by the second layer, the third layer including a continuous grouping of glass strands folded into a plurality of strips extending in overlapping relation across the width of the structure, the strips comprising two groups of strips, the groups being oriented obliquely with respect to a side corresponding to the side opposite to the common side of the first layer to extend from such corresponding side each group at an acute angle agreeing with the acute angle of the corresponding group in the first layer towards an end of the third layer corresponding to an end opposite the common end, the strips of each of the groups of the third layer extending generally parallel to each other in adjacent side-by-side relationship with their glass strands extending in generally mutually parallel relation lengthwise of the strips, the glass strands of all the overlapping strips in the second longitudinal layer being in touching relationship; and thread interengaging the layers effectively joining them together into an integral structure.

13. A longitudinal multilayer nonwoven structure for reinforcing resinous material combined therewith comprising:

a first longitudinal layer including a continuous grouping of glass strands folded into a plurality of successive strips extending in overlapping relation across the width of the structure, the strips comprising two groups of strips, the groups being oriented obliquely with respect to a common side to extend therefrom each group at a different acute angle towards a common end of the layer, the strips of each of the groups extending generally parallel to each other in side-by-side relationship with their glass strands extending in generally mutually parallel relation lengthwise of the strips, the glass strands of all the overlapping strips in the first longitudinal layer being in touching relationship;

a second longitudinal layer in comunication with the first layer including a plurality of whorled glass strands;

a third longitudinal layer in communication with the second layer and separated from the first layer by the second layer, the third layer including a continuous grouping of glass strands folded into a plurality of strips extending in overlapping relation across the width of the structure, the strips comprising two groups of strips, the groups being oriented obliquely with respect to a side corresponding to the side opposite to the common side of the first layer to extend from such corresponding side each group at an acute angle agreeing with the acute angle of the corresponding group in the first layer towards an end of the third layer corresponding to an end opposite the common end, the strips of each of the groups of the third layer extending generally parallel to each other in side-by-side relationship with their glass strands extending in generally mutually parallel relation lengthwise of the strips, the glass strands of all the overlapping strips in the second longitudinal layer being in touching relationship;

a fourth longitudinal layer and outer layer in communication with the third layer, the fourth layer including a plurality of short promiscuously disposed chopped glass strands; and threads interengaging the layers effectively joining them together into an integral structure.

14. A nonwoven structure for reinforcing resinous material combined therewith comprising:

a longitudinal layer including a continuous longitudinal grouping of individual mutually parallel glass strands extending in a direction lengthwise of such grouping, the continuous grouping being folded into successive strips extending in overlapping relation back and forth across the width of the layer, the strips forming a group of underlaying mutually parallel adjacent side-by-side strips and a group of overlapping mutually parallel adjacent side-by-side strips, the strips of the underlaying group being oriented obliquely to the longitudinal axis of the layer with the same acute angle towards an end of the layer, the strips of the overlaying group being oriented obliquely to the longitudinal axis of the layer with the same acute angle towards the end of the layer, the acute angle formed by the longitudinal axis and the strips of the underlaying group being different from the acute angle formed by the longitudinal axis and the strips of the overlaying group; and thread interengaging the strips effective to join them together into an integral structure.

References Cited

UNITED STATES PATENTS 2,315,851 4/1943 Goldman _____ 161—59
2,381,184 8/1945 Ripley _____ 161—59
3,044,146 7/1962 Thomas et al. _____ 161—50

MORRIS SUSSMAN, Primary Examiner

U.S. Cl. X.R.

161—142